No. 648,661. Patented May 1, 1900.
A. P. GEER.
THRUST BEARING FOR SHAFTS.
(Application filed Oct. 11, 1899.)
(No Model.)
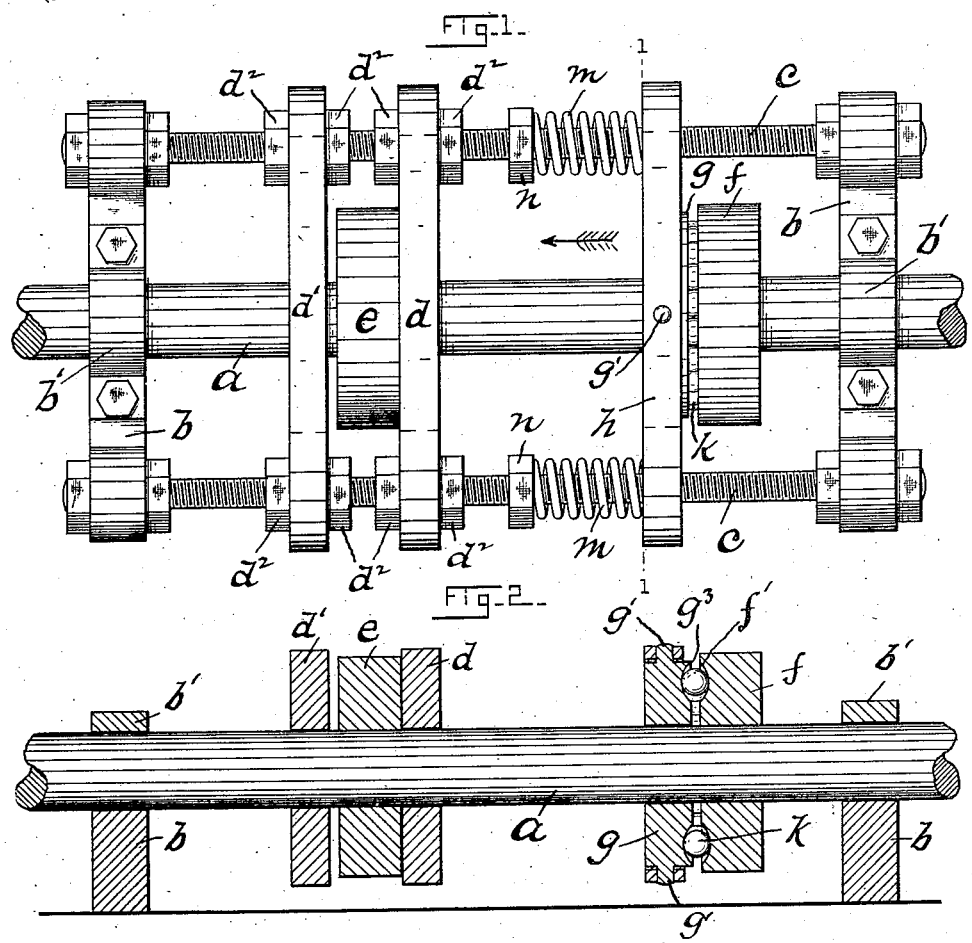
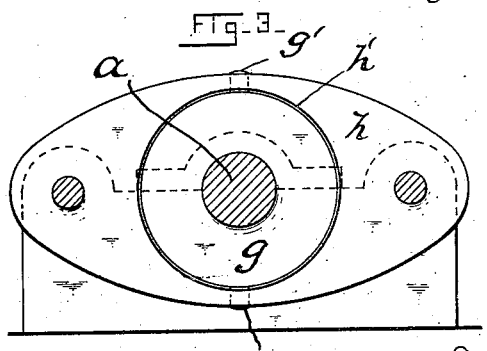
WITNESSES
INVENTOR
Albert P. Geer,
BY
Frank H. Allen
ATTORNEY.

UNITED STATES PATENT OFFICE.

ALBERT P. GEER, OF NEW LONDON, CONNECTICUT.

THRUST-BEARING FOR SHAFTS.

SPECIFICATION forming part of Letters Patent No. 648,661, dated May 1, 1900.

Application filed October 11, 1899. Serial No. 733,240. (No model.)

*To all whom it may concern:*

Be it known that I, ALBERT P. GEER, a citizen of the United States, residing at New London, in the county of New London and State of Connecticut, have invented certain new and useful Improvements in Thrust-Bearings for Shafts, of which the following is a full, clear, and exact description.

This invention is in a class of bearings designed for use in connection with propeller and the like shafts which are subject to great endwise pressure, either continuous or intermittent; and the particular object is to provide a bearing of the class mentioned which shall be of such construction that it shall act as a cushion to receive the said endwise pressure or thrust of the shaft, and thus do away with the strain and jarring that would otherwise be present. The said device is also of ball-bearing construction, thereby doing away greatly with the friction of running parts.

To assist in explaining my invention, the accompanying drawings have been provided, in which—
Figure 1 is a plan view of the newly-invented bearing. Fig. 2 is a vertical longitudinal sectional view thereof, and Fig. 3 a cross-sectional view taken on the line 1 1.

Referring to the drawings, the letter $a$ denotes a shaft suitably supported in pillow-block bearings $b$ and retained in such bearings by the caps $b'$. Supported in the said pillow-blocks, on each side the shaft $a$ and extending parallel therewith, are two threaded rods $c$, which latter receive and support a pair of plates $d$ $d'$, through which the shaft $a$ passes. The plates $d$ $d'$ are held in position on the rods $c$ by means of nuts $d^2$, which engage the opposite faces of the plates and by the adjusting of which the positions of the plates $d$ $d'$ may be readily controlled. The shaft $a$ bears thereon between the plates $d$ $d'$ a collar $e$, which latter is adapted to engage said plates to limit the endwise movement of the shaft, the extent of such movement of the shaft $a$ being of course dependent upon the distance apart of the plates $d$ $d'$. In addition to the collar $e$ the shaft $a$ has also mounted thereon a similar collar $f$, and adjacent to the latter the said shaft passes through a collar or disk $g$, supported in the following manner: The reference-letter $h$ denotes a plate similar to the plates $d$ $d'$ and mounted upon the threaded rods $c$. The plate $h$ has a circular opening $h'$ therein, within which the collar $g$ is received and supported by means of trunnions $g'$, provided on the collar $g$ and journaled in the plate $h$, which said trunnions $g'$ serve to axially support the collar $g$ at right angles to the length of the plate $h$, as shown in the drawings. The confronting faces of the collars $f$ and $g$ are provided with ball-races $f'$ and $g^3$, within which a ring of balls $k$ is located. The collar $g$ is held in close contact with the collar $f$ and the balls $k$ confined between said collars by means of spiral springs $m$, mounted on the threaded rods $c$ and engaging the face of the plate $h$ opposite that confronting the collar $f$, the said springs being confined between the plate $h$ and nuts $n$, mounted upon the threaded rods $c$. By the manipulation of the nuts $n$ the distance between the latter and the plate $h$ may be readily increased or diminished and the tension of the springs $m$ thus readily controlled.

Assume that a shaft is fitted up with my newly-invented bearing and that the same is under pressure or subject to sudden thrusts in the direction of the arrow in Fig. 1. Under the conditions just recited the pressure of the shaft in the direction indicated causes the collar $f$, having the ring of balls $k$ intermediate itself and the collar $g$, to transmit corresponding pressure to the collar $g$ and to the plate $h$, that supports said last-named collar, and from said plate $h$ the pressure is finally received upon the springs $m$, which latter provide a cushion by yielding sufficiently to do away with any strain or jar that might be brought to bear upon the shaft $a$, such jar or strain being particularly noticeable in the case of propeller-shafts, in which the endwise pressure or thrust is apt to be of an intermittent nature.

The nuts $n$ are usually set up sufficiently to produce such tension upon the springs $m$ that the latter will not yield under ordinary conditions; but should any unusual pressure occur which the springs $m$ might not be able to withstand the collar $e$ will, after a slight endwise movement, come into contact with the plate $d$, which latter will serve to prevent any further movement of the shaft $a$. It should be particularly noted in this connection that, while a cushioned effect is had upon the shaft by the yielding of the springs $m$, the endwise or thrust action of the shaft is limited and that a rigid thrust-bearing in both directions is provided—to wit, by the rigid disk $d$ in one direction and by the rigid disk $d'$ in the opposite direction.

In order that the collar $g$ shall be at all times at right angles to the shaft $a$ and parallel with the collar $f$, the said collar $g$ is trunnioned in the plate $h$, as above explained, so that no accurate adjustment of the plate $h$ is necessary in order to retain the collar $h$ in proper position relatively to the collar $f$ and so that the pressure upon the entire ring of balls shall at all times be automatically equalized.

When the shaft is under pressure in the direction of the arrow, the ring of balls $k$ intermediate the collars $f$ and $g$ serves to do away with the major portion of the friction which would exist were the said collars in contact with each other, and incidentally the shaft runs more freely and requires less power by reason of the ball-bearing thus provided.

My newly-invented device as a whole is of very simple construction, very easily operated, is not expensive to produce, and performs in a very satisfactory manner the office for which it was designed.

Having thus described my invention, I claim—

1. In combination with a suitably-journaled shaft, a fixed collar as at $e$ mounted upon said shaft, rigid plates mounted upon opposite sides of said collar, one of said plates being normally out of contact with said collar, and yielding means, substantially as specified, for retaining the said collar normally in contact with the companion plate.

2. In combination, a journaled shaft, a fixed collar as at $f$ mounted on said shaft, a spring-controlled plate, a disk trunnioned in said plate as set forth, and a ring of balls intermediate the confronting faces of the said collar and disk.

3. In combination, a journaled shaft having fixed collars $f e$, a spring-controlled frame, a disk trunnioned in said frame, a ring of balls intermediate the confronting faces of collar $f$ and the trunnioned disk, and means for limiting the endwise movement of the said collar $e$.

Signed at Norwich, Connecticut, this 28th day of September, 1899.

ALBERT P. GEER.

Witnesses:
FRANK H. ALLEN,
MAY F. RITCHIE.